United States Patent [19]
Komistek

[11] Patent Number: 6,099,742
[45] Date of Patent: Aug. 8, 2000

[54] INCLINED EMULSION TREATER

[76] Inventor: Stephen M. Komistek, 18 Meadow Court, Cochrane, Alberta, Canada, T0L 0W3

[21] Appl. No.: 09/244,892

[22] Filed: Feb. 5, 1999

[51] Int. Cl.[7] .................................................. C02F 1/40
[52] U.S. Cl. ..................... 210/774; 210/801; 210/180; 210/187; 210/519; 210/539; 210/540
[58] Field of Search ..................................... 210/774, 800, 210/801, 180, 187, 519, 521, 538, 539, 540, 188

[56] References Cited

U.S. PATENT DOCUMENTS

| | | | |
|---|---|---|---|
| 2,179,137 | 11/1939 | Millard | 210/187 |
| 2,613,811 | 10/1952 | Archibald | 210/540 |
| 2,726,729 | 12/1955 | Williams | 210/187 |
| 5,132,011 | 7/1992 | Ferris | 210/180 |
| 5,326,474 | 7/1994 | Adams et al. | 210/519 |
| 5,415,776 | 5/1995 | Homan | 210/539 |
| 5,837,152 | 11/1998 | Komistek et al. | 210/519 |
| 5,865,992 | 2/1999 | Edmondson | 210/540 |

*Primary Examiner*—Christopher Upton
*Attorney, Agent, or Firm*—Shoemaker & Mattare

[57] ABSTRACT

An emulsion treater has an elongate vessel for receiving oil in which water is emulsified and gas is entrained, and for separating these impurities from the oil. The vessel is supported so that the axis is oblique through the horizontal, thus defining an upper and a lower end, each of which is closed by a head which may be hemispherical in shape. An elongate sleeve extends coaxially through the vessel and has an upper sleeve end projecting through the upper vessel head, and is itself closed by an upper sleeve head. At the lower end, the sleeve is open, with the open end being located at an intermediate position in the vessel. An elongate firetube extends coaxially through the vessel and the sleeve, and projects through the upper sleeve head and through the lower vessel head, thus defining a chamber with the sleeve which surrounds the firetube. A burner is provided for injecting hot combustion gases into the firetube at the upper end. An oil inlet admits oil to the elongate sleeve, while a gas separator removes gas from the oil in the elongate sleeve. An oil outlet adjacent the upper vessel head removes oil from the vessel, and a water outlet adjacent the lower vessel head removes water from the vessel.

12 Claims, 7 Drawing Sheets

INCLINED EMULSION TREATER

This invention relates to pressure vessels, ar in particular to vessels for use in removing the last remaining water that is emulsified in oil. Such vessels are commonly referred to as emulsion treaters.

BACKGROUND OF THE INVENTION

Most oil fields have water saturated in the reservoir rock along with the oil. In every case the producing oil company has to deliver the oil to a certain sales specification. Free water is easily done with a vessel commonly called a Free Water Knockout (FWKO), however the water that is bound to the oil droplets cannot be separated with just a FWKO. Heat that is applied to a FWKO is not sufficient to remove enough water to achieve sales specifications. An emulsion treater, by contrast, is required to separate the emulsified oil and water.

Factors in the separation of water from oil are: retention time, heat, chemicals, centrifugal forces, and gravitational forces. Heat and chemicals are two important factors that help remove the last emulsified droplets of water from the oil. A successful emulsion treater should apply the beat evenly to all the incoming emulsion, and then make the emulsion travel the longest possible distance before it exits the emulsion treater. Providing a non-turbulent area and eliminating all incoming gas from the liquids promotes good separation of the oil and water droplets.

In order to provide good retention times many emulsion treaters are made very large. The fluid entering an emulsion treater tends to channel through the vessel if it is not obstructed. A large percentage of the volume in the emulsion treater is not fully utilized unless there are numerous baffles and coalescing plates. These internal baffles and coalescing plates add a large cost to the vessel, Large diameter vessels can add retention time, however they tend to be expensive and usually limit the pressures to less than 100 psi. Conventional emulsion treaters utilize a complicated system to monitor the oil-water interface, in order to determine when to dump the oil and water. The instrumentation to accomplish this is usually complex and expensive to operate.

Conventional emulsion treaters under consideration fall into two broad categories: horizontal and vertical, each type having its own advantages. Heat distribution is the most critical factor in removing water droplets from the oil. In a horizontal vessel larger firetubes can be added so that more heat can be added to the emulsion. Since a horizonal vessel can add more heat to the emulsion it is preferred by industry. However, much of the heat added is not efficiently applied to the fluid, and consequently heat is wasted in water and is lost up the firetube stack. The most effective design would add minimal heat to the water and have little or no heat go up the firetube stack.

PRIOR ART

A prior patent of interest is the Inclined Separation Tank (IST), U.S. Pat. No. 5,837,152, issued Nov. 27, 1998, to Stephen Michael Komistek, et al. This patent pertains to an inclined vessel construction which is utilized for separating oil and water received from oil wells. The device in this patent uses the incline to keep the oil/water interface as far as possible from the water outlet port. The IST does not use any heat, and it cannot provide sales quality oil.

GENERAL DESCRIPTION OF THE INVENTION

There is proposed an inclined emulsion treater (IET) that functions quite differently from the IST. For example, the IET does not keep the oil/water interface far from the water outlet, it does not coalesce oil drops that come into the vessel, it does not separate out gas in the primary vessel and there are no similarities in the internal piping. The inclined separation tank and the inclined emulsion treater do totally different jobs, although they can be used together to treat oil. The IST removes large volumes of water, while the IET removes water that the IST is not capable of removing.

More particularly, this invention provides an emulsion treater comprising: an elongate vessel for receiving oil in which water is emulsified and gas is entrained, and for separating both the water and the gas from the oil, the vessel having a longitudinal axis, means for supporting said vessel such that the axis is at an oblique angle to the horizontal, whereby the vessel has an upper end and a lower end, a lower vessel head closing the lower end, and an upper vessel head closing the upper end, an elongate sleeve extending substantially coaxially through the vessel and having an upper sleeve end which projects through said upper vessel head to terminate in an upper sleeve head which closes the sleeve, the sleeve further having an open lower sleeve end located in the vessel at an intermediate position between the ends of the vessel, an elongate firetube extending substantially coaxially through said vessel and sleeve, the firetube projecting through said upper sleeve head and through said lower vessel head, thereby defining with the sleeve a chamber which surrounds the firetube, burner means for injecting hot combustion gases into the firetube, oil inlet means for admitting oil to the elongate sleeve adjacent the upper sleeve end, gas separator means for removing gas from oil in the elongate sleeve, oil outlet means adjacent the upper vessel head for removing oil from the vessel, and water outlet means adjacent the lower vessel head for removing water from the vessel.

Furthermore, this invention offers a method of removing emulsified water and entrained gas from oil, utilizing an emulsion treater which includes an elongate vessel, means for supporting said vessel at an oblique angle to the horizontal, whereby the vessel has an upper end and a lower end, a lower vessel head closing the lower end, and an upper vessel head closing the upper end, an elongate sleeve extending centrally through the vessel and having an upper sleeve end which projects through said upper vessel head to terminate in an upper sleeve head which closes the sleeve, the sleeve further having an open lower sleeve end located at an intermediate position between the ends of the vessel, an elongate firetube extending centrally through said vessel and sleeve, the firetube projecting through said upper sleeve head and through said lower vessel head, thereby defining with the sleeve a chamber which surrounds the firetube, burner means for injecting hot combustion gases into the firetube, oil inlet means for admitting oil to the elongate sleeve adjacent the upper sleeve end, gas separator means for removing gas from oil in the elongate sleeve, oil outlet means adjacent the upper vessel head for removing oil from the vessel, and water outlet means adjacent the lower vessel head for removing water from the vessel; said method comprising simultaneously:

a) injecting hot combustion gases into said firetube,
b) admitting oil through the oil inlet means,
c) allowing oil to be removed through said oil outlet means,
d) allowing water to be removed through said water outlet means, and
e) allowing gas to be removed from the sleeve by said gas separator means.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
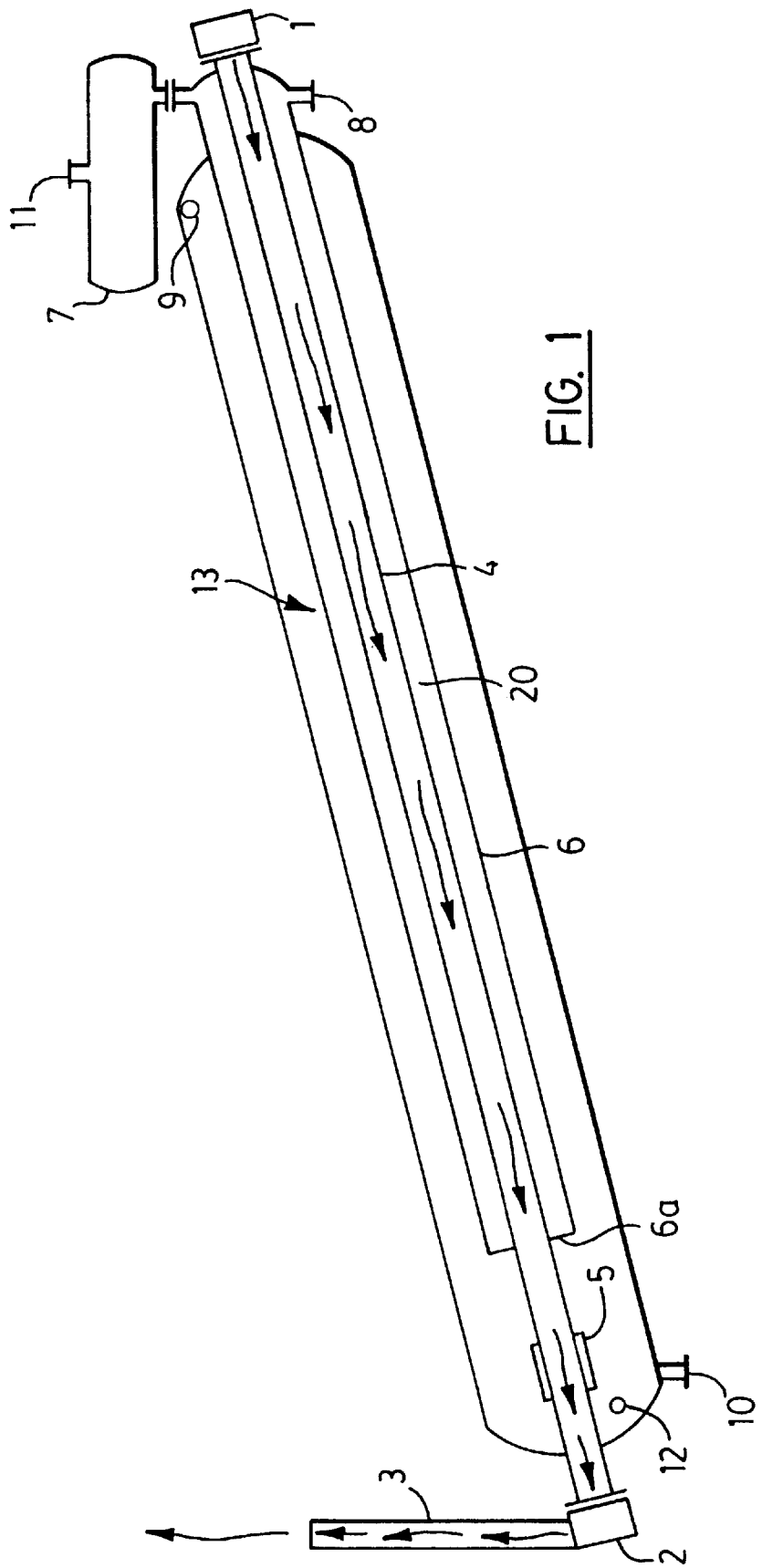
FIG. 1 is a somewhat schematic, axial sectional view through the emulsion treater of this invention, showing in particular the firetube flow path.

FIG. 1 shows the heat flow path of hot combustion gases down a firetube 4 and up the flare stack 3. By comparison, most conventional emulsion treaters have a U-tube firetube which is placed so as to contact the incoming oil. The design of the present invention uses a long straight firetube 4, which is such that by the time the flue gases exit the vessel, the heat has almost all been transmitted to the oil. In some cases a blower 2 may be needed to remove the flue gases. Depending on the temperatures in the firetube, an expansion joint may be needed to keep the deflection of the firetube to a minimum.

In accordance with the present invention, the vessel further incorporates a sleeve 6 defining around the firetube a conduction chamber 20. As seen in FIG. 1, the sleeve 6 does not extend all the way to the lower left extremity of the vessel, but instead terminates in an open end 6a.

It will be noted that the vessel 1, the sleeve 6 and the firetube 4 are all elongate cylinders, and are disposed coaxially and obliquely to the horizontal. This obliquity provides certain improvements by comparison with conventional emulsion treaters.

Figure 2:
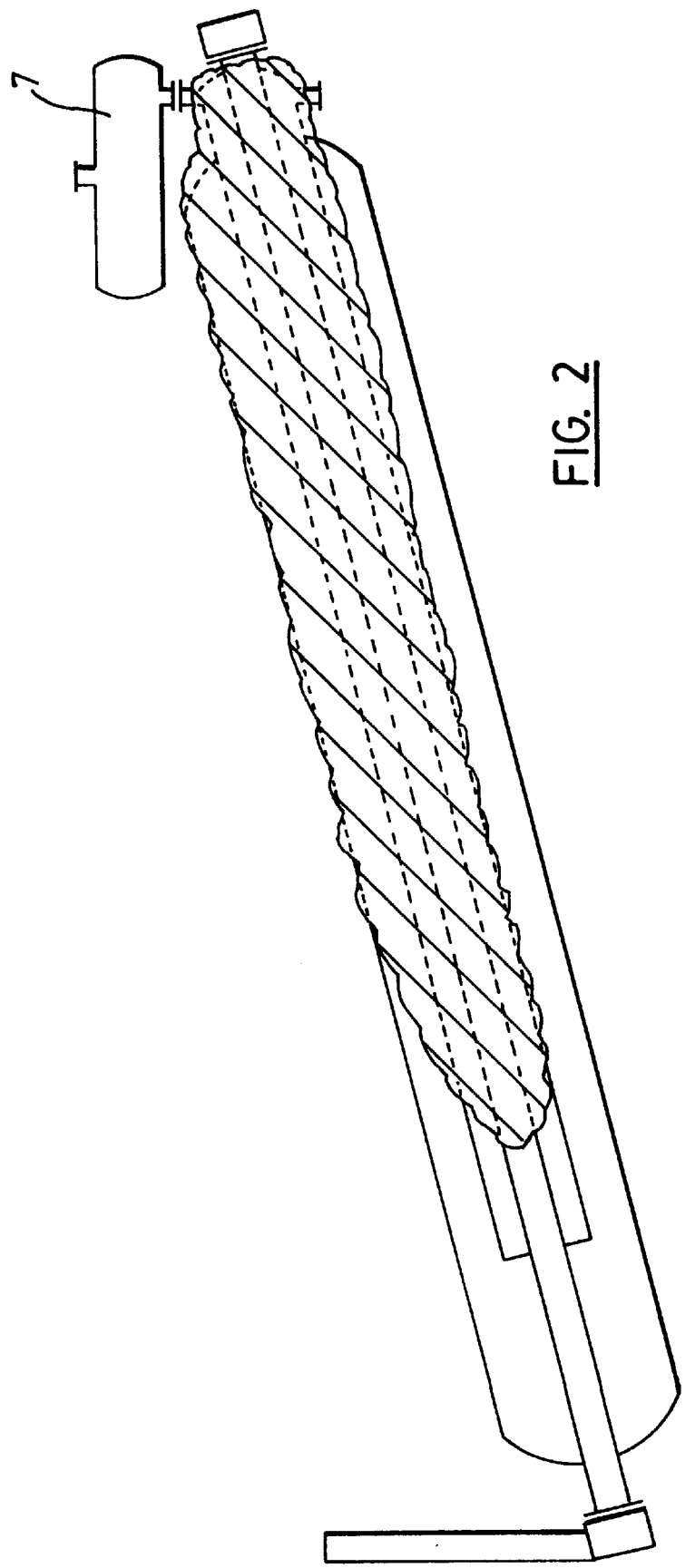
FIG. 2 is an axial sectional view similar to FIG. 1, but showing the area of highest heat distribution.
Figures 3, 3A:
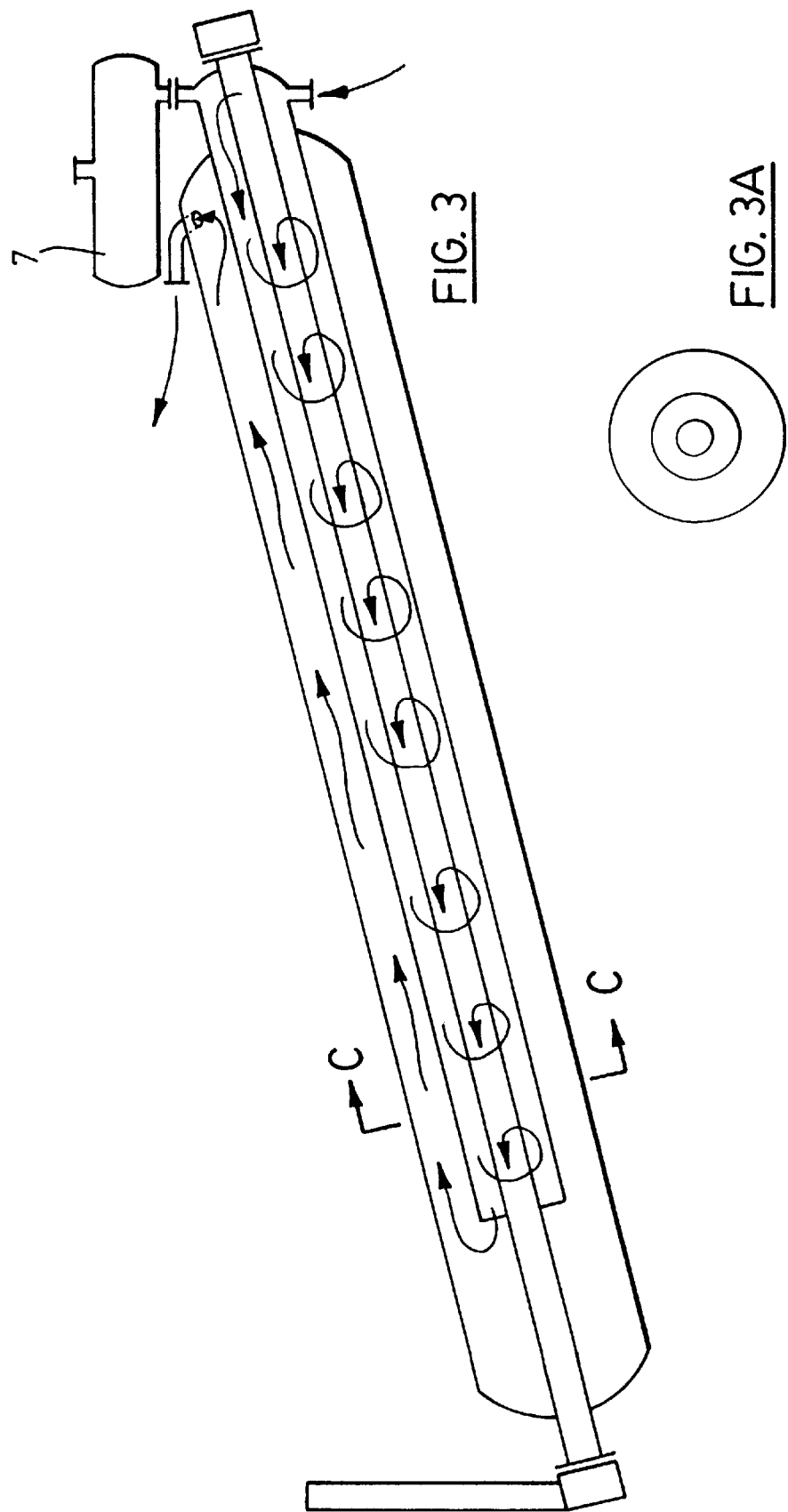
FIG. 3 is an axial sectional view similar to FIG. 1, showing the oil flow path.
Figure 4:
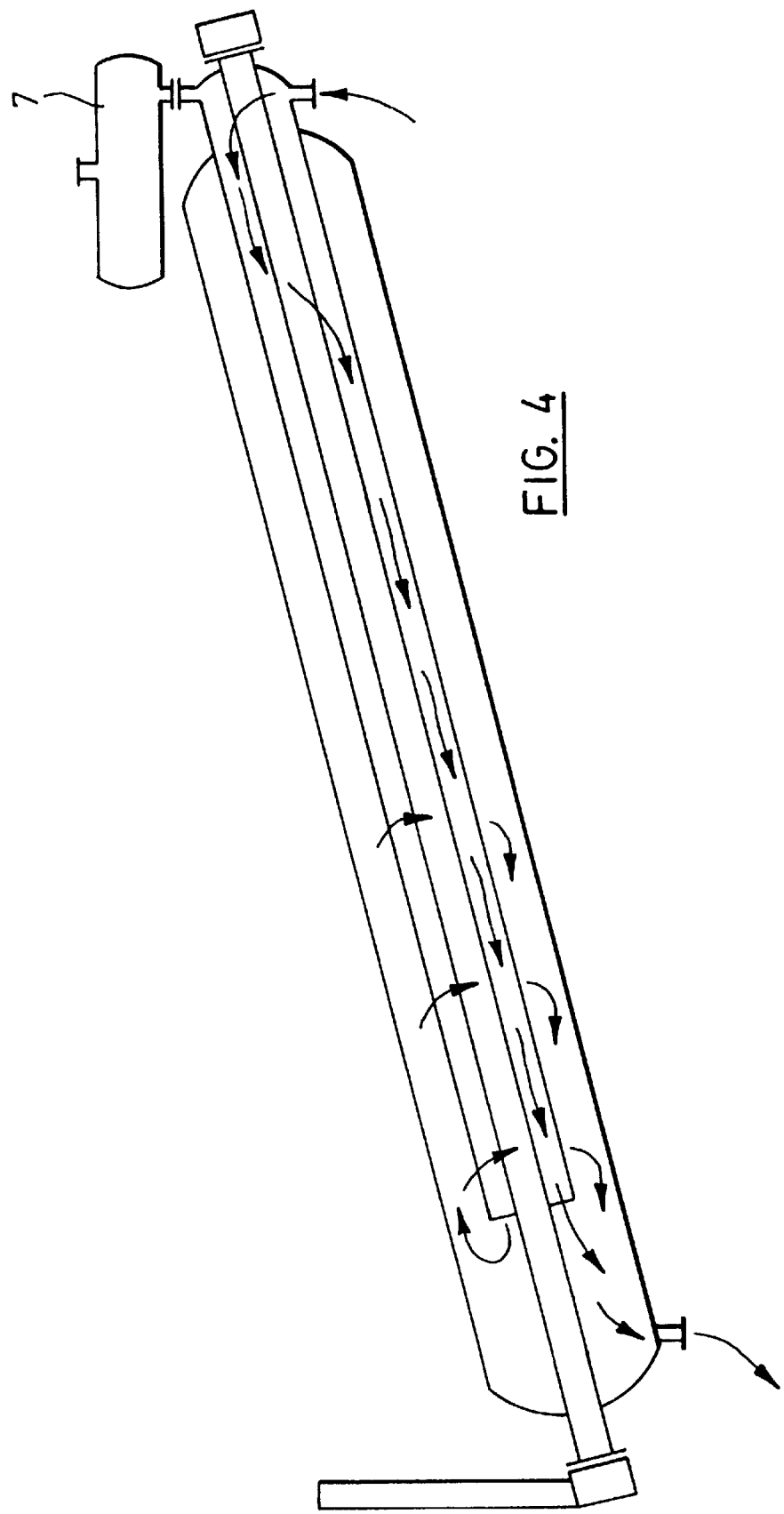
FIG. 4 is an axial sectional view similar to FIG. 1, showing the water flow path.

Firstly, the vessel in accordance with the present invention increases the efficiency of preferentially heating the oil over the water. The inclined firetube 4 along with the inclined conduction chamber 20, defined by the sleeve 6, will provide the largest amount of heat at the top of the incline, where the fluid first comes in. In FIG. 2, the heat distribution area is outlined and hatched to show that most of the heat is provided to the oil, with minimal heat going to the water. This heat distribution is made possible by inclining the firetube, the combustion chamber and the oil finishing chamber. The oil droplets inside the sleeve will wish to rise to the heat source to pick up more heat (FIG. 3) while the water will run down the incline and move away from the heat source (FIG. 4). As fluid continues to come in, it will eventually push out the heated oil. The most important factor in an emulsion treater is getting as much heat as possible into the oil, and as little heat as possible into the water. The inclination of the various components helps to provide this efficient heat distribution.

Figure 5:
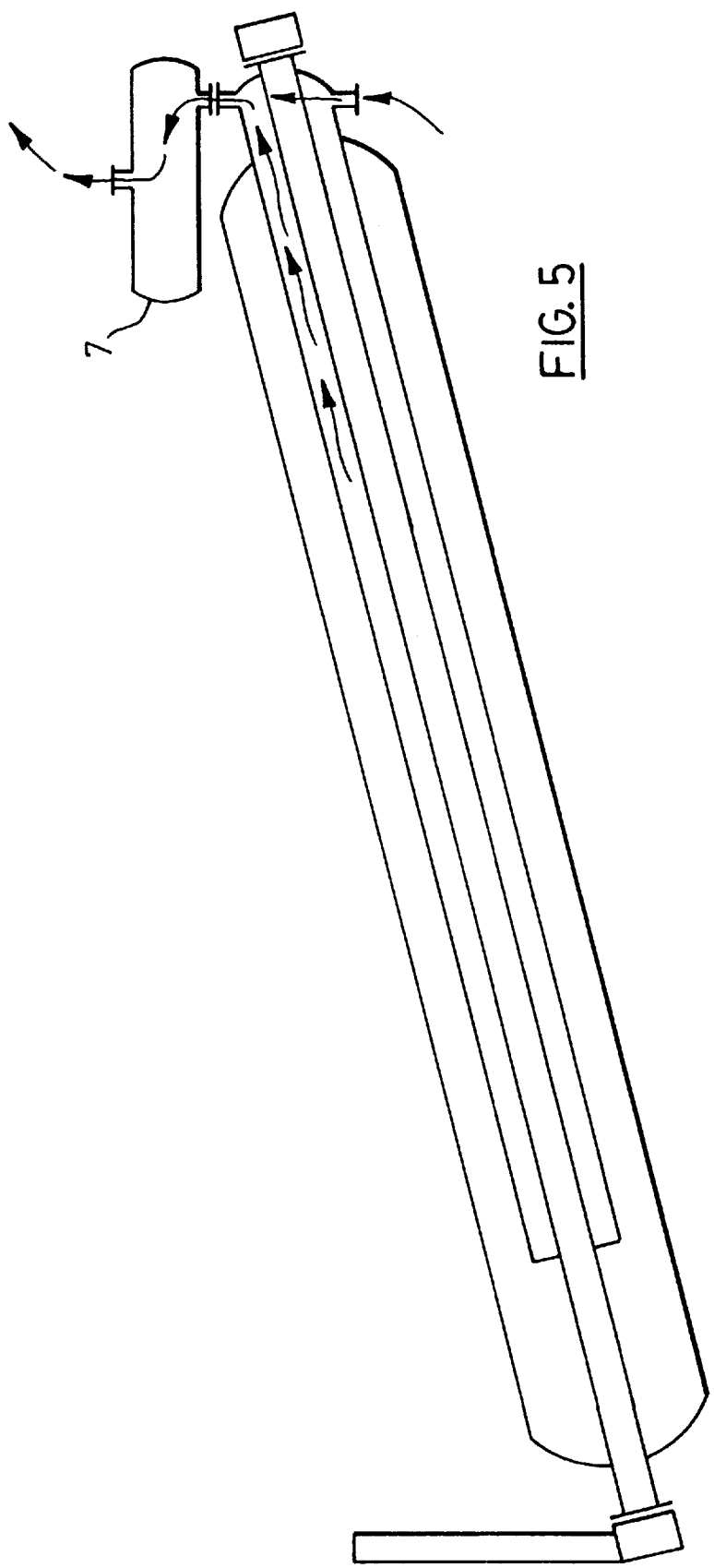
FIG. 5 is a view similar to FIG. 1, showing the gas flow path.
Figure 6C:
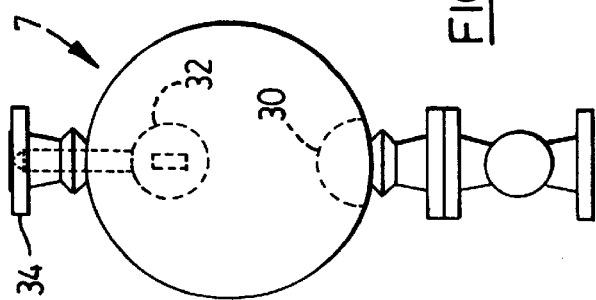
FIGS. 6A, 6B, 6C and 6D are an elevational view and two detail views of an automatic gas separator for use with his invention.
Figure 6D:
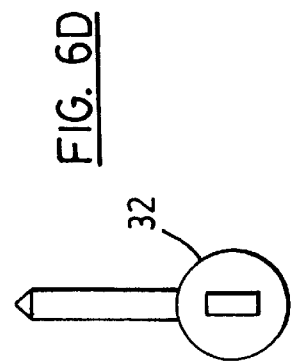
Figure 6A:
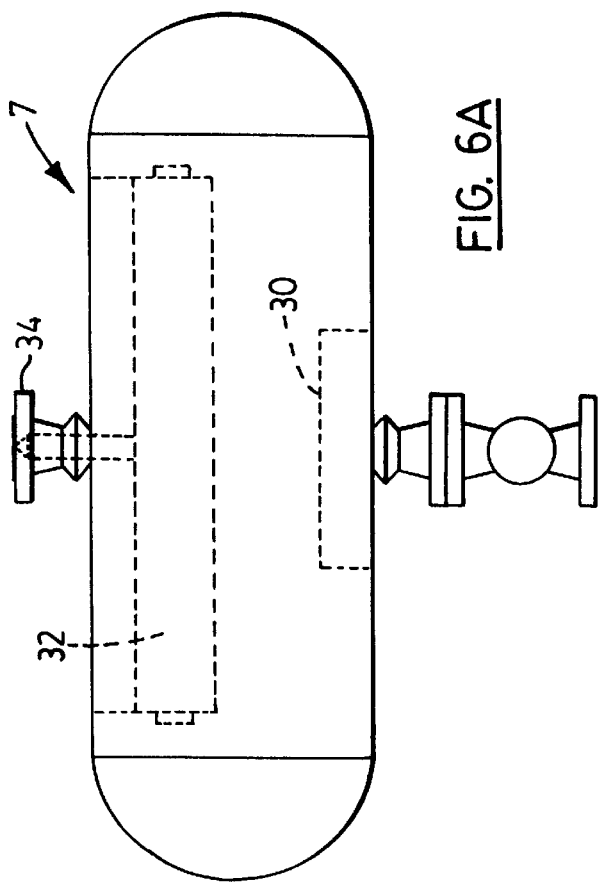
Figure 6B:
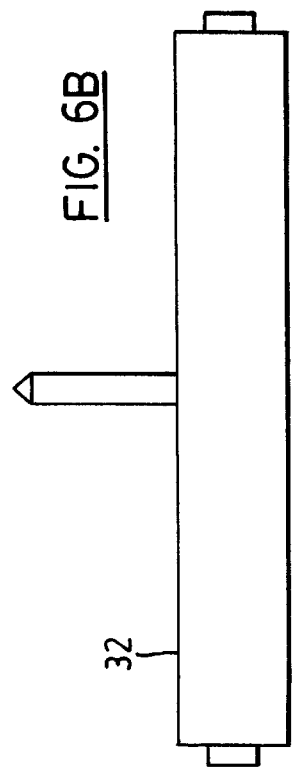

Secondly, heating the oil will liberate the last remaining gas in solution. This liberated gas will quickly be evacuated up the incline of the conduction chamber 20 to the automatic gas separator 7 (FIG. 5). Separating the gas at this point of the process will help improve heat conductivity and break up the emulsion more quickly.

Thirdly, the hottest oil will be at the top part of the conduction chamber 20 (defined by the sleeve 6) and any heat that escapes from the sleeve 6 will rise and be absorbed in the oil finishing chamber. This transfer of heat will ensure that most of the heat is going into the oil and not the water. The incline of the oil finishing chamber keeps the cleanest oil in the hottest region of the vessel so that the final cleanup of the oil can occur. In the inclined oil finishing chamber, water droplets that drop to the bottom of the sleeve can no longer conduct any heat. Once the water is below the sleeve, it gently rides down the incline to the bottom of the vessel, where all of the water is removed through a water outlet 10.

Preferably, the device of this invention incorporates an automatic gas separator 7 (see FIGS. 6A, 6B 6C and 6D), which quickly controls slugging of liquids and gases. The gas separator 7 allows fluids to enter into the bottom of the vessel. The incoming fluid hits a deflector plate 30 and disperses evenly into the gas separator. The incoming liquids lift a heavy float 32 until an outlet 34 is sealed off. When a gas slug enters the vessel it displaces the fluid, while the heavy weight of the float 32 overcomes the forces caused by the pressure differential at the gas outlet. The float 32 then drops and allows the gases to escape, until the liquid level rises and again closes off the gas outlet 34. This process proceeds continuously, evacuating the gases and containing the liquids.

The vessel removes fluid by way of gas, oil and water outlets. The gas outlet is controlled by the automatic gas separator 7. The water outlet 10 is controlled by an interface probe. The oil outlet 8 has no control. The incoming fluids that do not exit by way of the gas and water outlets exit through the oil exit. The interface probe monitors for oil, and if there is no oil it will open a valve until it detects oil. This is how water is removed from the emulsion treater.

Figure 7:
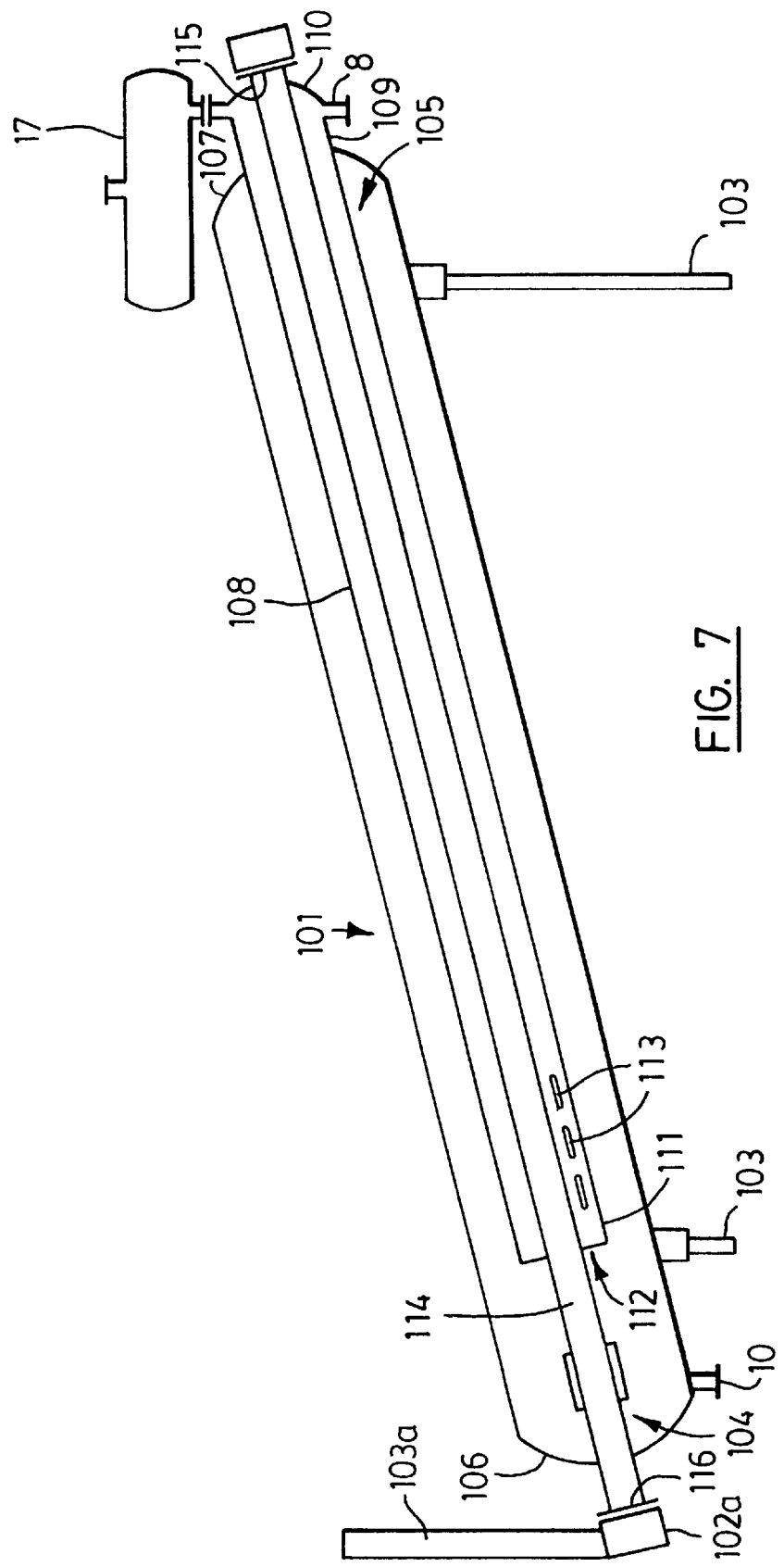
FIG. 7 is an axial sectional view showing possible support means for the main vessel.

Attention is now directed to FIG. 7 which shows a vessel constructed in accordance with one embodiment of the present invention. The vessel itself is illustrated at 101 and is configured to define an elongate structure which is mounted on pilings 103 in such a way that the longitudinal axis (about which the vessel is symmetrical) is disposed at an oblique angle to the horizontal.

Due to the sloping disposition, the vessel 101 has a lower end 104 and an upper end 105, with rounded, preferably hemispherical heads at 106 and 107, respectively closing the lower end 104 and the upper end 105. A sleeve 108 has an upper end 109 with a rounded head 110 and a lower end 111 which is totally open-ended, designated by the numeral 112. Perforated slots are provided at 113. The firetube 114 has a flange opening at the upper end 115, through which it can communicate with a source of combustion gases, and a lower end 116 communicating with a stack 103a which, as previously indicated, may have an attached blower 102a. Under many conditions, the ends of the firetube can be reversed, so that the stack is at the upper end and source of combustion gasses is at the lower end.

In this connection, the length of the vessel 101 and the angle of elevation should be selected in such a way as to maximize the angle while still utilizing a workable height at the highest part of the vessel. Generally, the shell of the vessel 101 should be sized to contain the required firetube, sleeve and oil finishing chamber for the given flow rates. In making the necessary computations, the size of the firetube is first determined so that the proper amount of heat will be supplied to raised the required volume of liquid to the desired temperature. The conduction chamber (the interior of the sleeve 108) is then sized so that it provides the required retention time for the heat to be applied and for the required temperature to be attained by the fluid. The oil finishing chamber is then sized to give the remaining retention time to eliminate the last droplets of water.

While one embodiment of this invention has been illustrated in the accompanying drawings and described hereinabove, it will be evident to those skilled in the art that changes and modifications may be made therein, without departing from the essence of this invention as set forth in the appended claims.

The embodiments of the invention in which an exclusive property or privilege is claimed are defined as follows:

1. An emulsion treater comprising:
    an elongate vessel for receiving oil in which water is emulsified and gas is entrained, and for separating both the water and the gas from the oil, the vessel having a longitudinal axis,
    means for supporting said vessel such that the axis is at an oblique angle to the horizontal, whereby the vessel has an upper end and a lower end,
    a lower vessel head closing the lower end, and an upper vessel head closing the upper end,
    an elongate sleeve extending substantially coaxially through the vessel and having an upper sleeve end which projects through said upper vessel head to terminate in an upper sleeve head which closes the sleeve, the sleeve further having an open lower sleeve end located in the vessel at an intermediate position between the ends of the vessel,
    an elongate firetube extending substantially coaxially through said vessel and sleeve, the firetube projecting through said upper sleeve head and through said lower vessel head, thereby defining with the sleeve a chamber which surrounds the firetube,
    burner means for injecting hot combustion gases into the firetube,
    oil inlet means for admitting oil to the elongate sleeve adjacent the upper sleeve end,
    gas separator means for removing gas from oil in the elongate sleeve,
    oil outlet means adjacent the upper vessel head for removing oil from the vessel, and
    water outlet means adjacent the lower vessel head for removing water from the vessel.

2. The emulsion treater claimed in claim 1, in which the gas separator means is connected to substantially the highest location within the elongate sleeve.

3. The emulsion treater claimed in claim 2, in which the gas separator means is automatic and has a horizontal structure which is closed at both ends.

4. The emulsion treater claimed in claim 1, in which said oil outlet means is connected to substantially the highest location within the vessel, and in which the water outlet means is connected to substantially the lowest location within the vessel.

5. The emulsion treater claimed in claim 1, in which the vessel and the sleeve are substantially cylindrical and coaxial, all said heads being substantially hemispherical.

6. The emulsion treater claimed in claim 1, in which the burner means injects hot combustion gas into the firetube adjacent the upper sleeve head, and in which a blower means is provided at the lower end of the firetube, for exhausting products of combustion from the firetube.

7. The emulsion treater claimed in claim 6, in which said blower means urges said products of combustion into a substantially vertical stack.

8. The emulsion treater claimed in claim 1, in which the sleeve has a plurality of apertures adjacent its lower end.

9. A method of removing emulsified water and entrained gas from oil, utilizing an emulsion treater which includes an elongate vessel, means for supporting said vessel at an oblique angle to the horizontal, whereby the vessel has an upper end and a lower end, a lower vessel head closing the lower end, and an upper vessel head closing the upper end, an elongate sleeve extending centrally through the vessel and having an upper sleeve end which projects through said upper vessel head to terminate in an upper sleeve head which closes the sleeve, the sleeve further having an open lower sleeve end located at an intermediate position between the ends of the vessel, an elongate firetube extending centrally through said vessel and sleeve, the firetube projecting through said upper sleeve head and through said lower vessel head, thereby defining with the sleeve a chamber which surrounds the firetube, burner means for injecting hot combustion gases into the firetube, oil inlet means for admitting oil to the elongate sleeve adjacent the upper sleeve end, gas separator means for removing gas from oil in the elongate sleeve, oil outlet means adjacent the upper vessel head for removing oil from the vessel, and water outlet means adjacent the lower vessel head for removing water from the vessel; said method comprising simultaneously:
    a) injecting hot combustion gases into said firetube,
    b) admitting oil through the oil inlet means,
    c) allowing oil to be removed through said oil outlet means,
    d) allowing water to be removed through said water outlet means, and
    e) allowing gas to be removed from the sleeve by said gas separator means.

10. The method claimed in claim 9, in which gas is removed by the gas separator means at substantially the highest location within the elongate sleeve.

11. The method claimed in claim 9, in which oil is removed from the vessel at substantially the highest location within the vessel, and in which water is removed from the vessel at substantially the lowest location within the vessel.

12. The method claimed in claim 9, further including simultaneously using a burner for injecting hot combustion gasses into the firetube at the upper end thereof, and a blower means at the lower end of the firetube to exhaust products of combustion from the firetube.

* * * * *